United States Patent [19]

Baker et al.

[11] 4,194,038

[45] Mar. 18, 1980

[54] POLY(ESTER-CARBONATES) FROM DICARBOXYLIC ACID CHLORIDES

[75] Inventors: Josefina T. Baker, Cupertino, Calif.; Robert S. Cooke, Morris Plains; Stylianos Sifniades, Madison, both of N.J.

[73] Assignee: Allied Chemical Corporation, Morristown, N.J.

[21] Appl. No.: 6,947

[22] Filed: Jan. 25, 1979

[51] Int. Cl.² .......................................... C08G 63/64
[52] U.S. Cl. .................................. 528/182; 528/194; 528/196; 528/199
[58] Field of Search ................ 528/182, 194, 196, 199

[56] References Cited

U.S. PATENT DOCUMENTS

| | | | |
|---|---|---|---|
| 3,169,121 | 2/1965 | Goldberg | 528/194 |
| 3,313,862 | 4/1967 | Siggel et al. | 528/194 |
| 4,127,561 | 11/1978 | Alewelt et al. | 528/196 |

*Primary Examiner*—Lester L. Lee
*Attorney, Agent, or Firm*—Robert A. Harman

[57] ABSTRACT

A process for poly(ester-carbonates) from dihydric phenols, especially bisphenol A; aromatic or cycloaliphatic dicarboxylic acids, especially terephthalic acid; and phosgene as carbonate precursor wherein a reaction of the acid and phosgene is carried out in a first stage forming dicarboxylic acid chloride; and then phosgene and bisphenol A are added in separate streams, simultaneously during most of the second or condensation stage. Thereby only one kettle is required for carrying out the complete polymer production.

5 Claims, No Drawings

POLY(ESTER-CARBONATES) FROM DICARBOXYLIC ACID CHLORIDES

BACKGROUND OF THE INVENTION

It is known (allowed U.S. patent application Ser. No. 846,098 filed Oct. 27, 1977 and now U.S. Pat. No. 4,129,594 of J. T. Baker et al. for "Process for the Manufacture of Aromatic Dicarboxylic Acid Chlorides") that said dichlorides can be prepared in very high yield and purity from the corresponding dicarboxylic acids by action of an inorganic acid chloride such as phosgene in a medium of weak tertiary nitrogen base/chlorinated paraffinic hydrocarbon solvent, especially pyridine/dichloromethane. The resulting dichloride can be isolated in pure form prior to use or can be added as the slurry containing dissolved dichloride and slurried hydrochloride salt of the base employed, to a solution (in weak base/solvent medium) of a dihydric phenol for production of polyesters of the aromatic dicarboxylic acids and the dihydric phenols.

To such polyester, in the form of low molecular weight oligomers in solution, a reactive precursor of carbonate formation such as phosgene can be added to produce poly(ester-carbonate), in particular the poly(ester-carbonate) consisting of bisphenol A, terephthaloyl chloride and carbonate units. (Such process is more particularly disclosed in U.S. patent application Ser. No. 764,623 of Prevorsek et al. filed Feb. 1, 1977 and now U.S. Pat. No. 4,156,069 and published as West German patent publication DOS No. 2,714,544 of Oct. 6, 1977). Moreover, process conditions have been disclosed capable of producing species of poly(ester-carbonates) from a dihydric phenol, a dicarboxylic acid and a carbonate precursor such as phosgene, using pyridine alone without a diluent as the medium (U.S. Pat. No. 3,169,121 of Feb. 9, 1965 to E. P. Goldberg). The disclosure therein of operative dihydric phenols and operative aromatic and cycloaliphatic dicarboxylic acids is incorporated herein by reference on the basis that we regard all these materials as operative in accordance with the present invention to obtain products with properties at least equal to those obtained from the same starting materials in accordance with said Goldberg disclosure.

The process of the above noted allowed U.S. Application Ser. No. 846,098 for poly(ester-carbonates) via aromatic dicarboxylic acid chlorides involves use of one reaction vessel in which the dichloride is prepared; and a second reaction vessel in which the slurry containing dissolved dichloride is added to a solution, in a chlorinated hydrocarbon solvent containing weak base, of a bisphenol whereby to obtain low molecular weight polyester oligomers, to which phosgene is then added to obtain the desired poly(ester-carbonate). Various bisphenols and aromatic dicarboxylic acids are specifically disclosed for use in that process. Such poly(ester-carbonate), as disclosed in the above cited U.S. Application Ser. No. 764,623 desirably shows viscosity number (i.e. reduced viscosity=specific viscosity/concentration) in the range 0.6–1.0 dL/g at 0.5 g/100 mL concentration in 60:40 by weight phenol:sym—tetrachloroethane and $T_g$ of at least 170° C. and has good transparency, as determined upon plaques produced by compression molding (at 315° C.) having transmission haze value (ASTM D1003) of not over 15%, preferably not over 10%.

SUMMARY OF THE INVENTION

Instead of using a first vessel in which a dicarboxylic acid dichloride is prepared and a second vessel in which it is added to a dihydric phenol, as in the above discussed procedure of the prior art for producing poly(ester-carbonates), it would be operationally and economically advantageous to produce the poly(ester-carbonate) in one and the same reaction vessel as contains the dicarboxylic acid chloride preparation.

A problem is, however, raised when the charge of dihydric phenol is added to the dicarboxylic acid chloride rather than combining these reagents in the opposite sense as disclosed in allowed U.S. application Ser. No. 846,098 and U.S. application Ser. No. 764,623. During the formation of poly(ester-carbonate) with the desired mol ratio (in the range 1.00:0.05 up to 1.00:0.70) of dihydric phenol:dichloride residues, the addition of dihydric phenol to dicarboxylic acid chloride necessarily involves a stage at which nearly equimolar amounts of the two reagents have been charged. Near this equivalence point, which is not encountered in the procedures disclosed in allowed U.S. application Ser. No. 846,098 and U.S. application Ser. No. 764,623, formation of substantial proportions of relatively long polyester chains can be expected, to an extent dependent on the rate of addition of the dihydric phenol relative to the rate of reaction of the acid chloride functionality with the phenol functionality. Under concentration conditions of practical interest the rate of reaction is so high that it is not technically feasible to introduce the dihydric phenol at a sufficiently high rate to forestall formation of long polyester chains, especially in view of the relatively strong heat evolution that accompanies the reaction.

To the extent that long polyester chains are formed, a corresponding amount of the dihydric phenol ultimately charged remains unreacted; so that in presence of a polycarbonate precursor, it will form long polycarbonate chains. The result will be to form polymer containing a certain proportion of long polyester blocks and long polycarbonate blocks rather than the short polyester and polycarbonate chain segments desired (having a sequence of repeating units approximating the regularly recurring sequence or the statistically random distribution).

For example, addition of all the required bisphenol A (as the dihydric phenol) at 1.0:0.5 mol ratio with terephthaloyl chloride (as the dicarboxylic acid chloride) ahead of phosgene (carbonate precursor) was found in fact to produce a precipitate believed to be ester oligomers of higher molecular weight than desired, and to result in a final poly(ester-carbonate) product which was opaque (100.5% transmission haze value) in the standard transmission haze test.

If part or all of the polycarbonate precursor is introduced into the dicarboxylic acid chloride charge prior to the addition of the dihydric phenol, long polyester chain formation can be expected upon subsequent addition of dihydric phenol, to an extent depending on the relative concentration of carbonate precursor and acid chloride present and on the relative rate of ester formation versus carbonate formation. If carbonate formation becomes much faster than ester formation, long polycarbonate blocks are formed initially with corresponding amounts of dihydric phenol becoming available for subsequent formation of long polyester blocks. For example, the final product was practically opaque (96.5% transmission haze value) when about 90% of the theoretically required phosgene was added to a reaction vessel containing the terephthaloyl chloride charge, ahead of bisphenol A.

Accordingly it will be seen that a problem is raised as to whether, and how, the desired course of reaction can be achieved in a single reaction vessel, whereby to obtain product which is satisfactorily melt processible as indicated by compression molding to substantially clear plaques, in the sense that plaques of about one eighth inch (2.5–3.8 millimeters) thickness show transmission haze value not over 15% (ASTM D1003); having viscosity number in the range 0.6–1.0 dL/g; having excellent impact resistance (especially Izod impact resistance of at least 5.0 foot pounds per inch of notch (2.7 N·m/cm); having high $T_g$, especially at least 170° C.; and having good heat deflection resistance, especially not over 15° C. below the value of $T_g$.

We have thoroughly studied the interactions and competing reactions between typical reactants and catalysts involved in the desired 1-kettle, 2-stage process for poly(ester-carbonate); and have found that such process can be successfully conducted to produce poly(ester-carbonate) of the desired properties by procedure as follows.

A reaction mixture containing at least one dissolved aromatic or cycloaliphatic dicarboxylic acid chloride, and generally containing also unreacted excess weak base, unreacted excess phosgene and undissolved hydrochloride salt of the weak base employed, is produced from the diacid; in particular in accordance with the procedure of the above noted allowed U.S. patent application Ser. No. 846,098. More particularly, phosgene is brought into reaction with the acid in a chlorinated hydrocarbon solvent, inert under the reaction conditions, having from 1 to 6 carbon atoms and from 1 to 4 chlorine atoms, using as catalyst and hydrogen chloride acceptor a weak tertiary nitrogen base having $pK_b$ in aqueous solution at 25° C. in the range between 7 and 11.

Then in accordance with this invention, at least one dihydric phenol such as set forth in the above noted U.S. Pat. No. 3,169,121 is fed (suitably in solution in the desired reaction medium) into the dichloride solution, alone or mixed with another dihydric phenol, at temperature in the range of 0°–100° C. In accordance with the invention, at the start of such feed of dihydric phenol, the diacid chloride solution in the reaction vessel contains phosgene dissolved therein in the range between 10% and 50% of the stoichiometric proportion of phosgene: total dihydric phenol required for formation of the poly(ester-carbonate) with the desired mol ratio (in the range 1.00:0.05 up to 1.00:0.70) of dihydric phenol:dichloride residues. Further in accordance with the invention, concurrently with the feeding of dihydric phenol, the reaction mixture is agitated and phosgene is fed in a separate stream thereto, until all dihydric phenol for the reaction has been added and at least 80% but not over 97% of the stoichiometrically required phosgene has been added. During the addition of dihydric phenol and phosgene, an excess of base is maintained in the reaction mixture of at least 10% over that required to react with hydrogen chloride being formed. When all dihydric phenol has been added, time is allowed, in the process of this invention, for the condensation reactions forming poly(ester-carbonate) to come essentially to completion; for example by maintaining the reaction conditions for a holding period during which no further phosgene is added, and by introducing the final quantity of phosgene at a reduced rate. The phosgene so added is brought to at least the stoichiometric quantity and suitably to at least 5% above stoichiometric to assure completion of the formation of the desired carbonate linkages.

DETAILED DESCRIPTION OF PREFERRED EMBODIMENTS

The dihydric phenols useful in the invention are, as above noted, known in the prior art for production of poly(ester-carbonates). Likewise the aromatic and cycloaliphatic dicarboxylic acids and conversion thereof to the corresponding dichlorides are broadly known in the prior art.

In the present process, as above noted, the required dicarboxylic acid dichloride starting materials are synthesized in a first stage from the corresponding dicarboxylic acids by use of phosgene in the presence of a weak tertiary nitrogen base. We have found that the base should preferably have $pK_b$ in the range between 7 and 9 in aqueous solution at 25° C.

Particularly suitable weak tertiary nitrogen bases include pyridine, and the picolines. Much stronger tertiary nitrogen bases such as triethylamine ($pK_b = 3.24$ in aqueous solution at 25° C.) are unsatisfactory because they react with phosgene.

As the solvent, inert under the conditions of the reaction, dichloromethane ("DCM") is particularly useful because its volatility allows easy separation from the product when the poly(ester-carbonate) production is complete.

The general conditions described in the above cited U.S. patent application Ser. No. 846,098 can be employed in the first stage production of dicarboxylic acid dichlorides, and will produce dichlorides essentially free of anhydride impurity. It will be appreciated that freedom from anhydride impurity is a matter of some difficulty in that the acid chloride product tends to react with the acid starting material to form the acid anhydride. Freedom from such acid anhydride, to a high degree, is important, as discussed in the above cited U.S. patent application Ser. No. 764,623 to obtain high quality poly(ester-carbonate) as the final product.

The reaction of dicarboxylic acid chloride with dihydric phenol and phosgene to form the desired poly(ester-carbonates) is a condensation-polymerization reaction, which can be represented overall by the following equation:

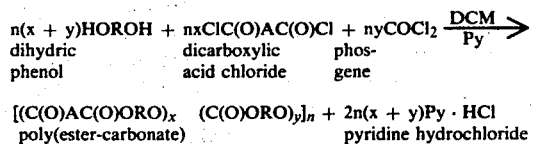

$$[(C(O)AC(O)ORO)_x \quad (C(O)ORO)_y]_n + 2n(x + y)Py \cdot HCl$$
poly(ester-carbonate) \qquad\qquad\qquad pyridine hydrochloride It will be seen that the desired reaction involves the product of the above dichloride synthesis and also the phosgene reactant of the above dichloride synthesis. Again it is necessary to use a weak base catalyst-hydrogen chloride acceptor and a suitable solvent. The steps necessary for purification of the final poly(ester-carbonate) will be simplified by using, if possible, only the same tertiary nitrogen base and solvent as those carried over into the second (the condensation-polymerization) stage as part of the reaction medium from the first (the dichloride synthesis) stage. We have found that the same tertiary nitrogen bases and solvents useful for the dichloride synthesis are in fact effective to produce essentially quantitative conversion of the dihydric phenols and dicarboxylic acid chlorides and phosgene into poly(ester-carbonates) containing essentially the same mol ratios of the dihydric phenol and dichloride residues as present in the overall charges used for this condensation-polymerization reaction; and having the dichloride residues and carbonate linkages combined with the dihydric phenol residues in short chain segments having the residues arranged along the full length of the chains in sequence approximating the regularly recurring sequence or the statistically random distribution. The resulting products from, in particular, bisphenol A ("BPA"), terephthaloyl chloride ("TPC") and phosgene in molar ratio 1.0:0.5:0.5 of BPA:TPC:carbonate have the desirable properties above noted for poly(ester-carbonates), prepared using the same reactants in the same proportions, by the processes of the prior art requiring two separate reaction vessels, one for production of the dichloride and a second for production of the poly(ester-carbonate) by adding the dichloride to bisphenol A and then adding phosgene to the resulting low molecular weight polyester oligomers.

The final mol ratios of dihydric phenol:dichloride brought into reaction in accordance with this invention will usually be in the range from 1.00:0.05 up to 1.00:0.70, and an excess of phosgene will be used over the stoichiometric requirement for forming poly(ester-carbonate).

To obtain desirable properties of heat resistance and impact strength, it is preferred to use, as the dihydric phenol, principally bisphenol A and as the dichloride, principally terephthaloyl chloride; any minor content of dihydric phenol being preferably another bisphenol, especially 2,2-bis(3-chloro-4-hydroxyphenyl)propane; and any minor content of dichloride being preferably isophthaloyl chloride, benzophenone dicarboxylic acid chloride, and/or cyclohexane dicarboxylic acid chloride.

The proportion of weak tertiary base:solvent in the reaction medium for poly(ester-carbonate) production, and the concentrations of the dichloride and dihydric phenol solutions, can be broadly as in the prior art.

A particular requirement of our present process, noted above, is initial presence of 10%–50% of the phosgene stoichiometrically required for formation of the desired poly(ester-carbonate) final product. The reason for this requirement is not entirely understood, but presumably arises from the necessity of maintaining in balance the competition between dicarboxylic acid dichloride and phosgene for reaction with the dihydric phenol. When the stated limits are transgressed in either direction there is a tendency toward haziness of the final poly(ester-carbonate), approaching opacity in extreme cases. A preferred range for this initial phosgene proportion is 20%–40% of the stoichiometric requirement, when the desired product is to have mol ratio of 1.0:0.5:0.5 of bisphenol A:terephthalate:carbonate residues.

Another particular requirement of the present invention, above noted, is concurrent feed of all dihydric phenol for the final product along with most but not all of the phosgene (beyond the initial phosgene charge) stoichiometrically required to combine with the dihydric phenol for the final poly(ester-carbonate). Again this requirement appears to be dictated by the necessary balance between reactions; failure to maintain essentially concurrent feed leads again to a haze problem.

A further above noted requirement is maintaining an excess of the tertiary nitrogen base, over that required to react with hydrogen chloride being formed, during the feeding of dihydric phenol, such as a 10% excess or more. A 30% or more excess of base is preferred, since maintaining the catalyst concentration at or above this value accelerates the condensation process and insures production of material with a desired, sufficiently high molecular weight.

The requirement of stopping the dihydric phenol feed before the full stoichiometric quantity of phosgene has been added is to allow time for reaction between hydroxyl groups of the dihydric phenol and chloride groups of dicarboxylic acid chloride and of phosgene which has been thus far introduced. Apparently there is a problem of introducing too high a concentration of phosgene at the time when reaction has led to a low residual dichloride concentration, with concomitant reduction in the rate of reaction of the dichloride with hydroxyl groups versus the rate of reaction of incoming phosgene with the hydroxyl groups. The necessary time can be allowed by withholding further feed of phosgene for a certain period, and/or by reducing the rate of phosgene feed while the phosgene is being brought at least to the stoichiometrically required quantity. The precise duration of such holding period and reduction in phosgene addition rate for desired results can best be set by a few preliminary tests. Other conditions employed are generally as in the prior art, including use of a phenolic chain stopper such as t-butylphenol to control the viscosity of the final product and thorough drying of the environment to avoid hydrolysis of the dichloride and phosgene reactants. The reaction can generally be run conveniently at a temperature between 0° C. and 50° C., especially between 15° and 35° C.; and somewhat below the atmospheric pressure boiling point of the reaction medium, such that equipment designed for superatmospheric pressure operation is not required.

The examples which follow are illustrative of our invention and of the best mode contemplated by us for carrying out our invention, but we do not regard our invention as limited to all details of the examples.

Preparation of Poly(ester-carbonate) from Terephthalic Acid, Bisphenol A and Phosgene Example 1

A 1000-ml flask equipped with a mechanical stirrer, thermometer, gas inlet tube, addition funnel and solid $CO_2$ condenser attached to a caustic scrubber was charged with 260 mL dichloromethane. The flask was immersed in an ice bath, and the temperature was maintained at 3°–5° C. with stirring at approximately 200 rpm while 21.74 g (219.8 mmol) phosgene was introduced over 96 minutes (0.24 g/min); and 17.38 g (219.7 mmol) pyridine was added. (See note (1) below). The temperature of the reaction mixture was then raised to 25° C., and the stirring rate was increased to 500 rpm. A slurry of 16.59 g (99.9 mmol) terephthalic acid in 57 ml dichloromethane was added over 35 minutes. The temperature and stirring rate was maintained for an additional 30 minutes. As disclosed in the above cited allowed application Ser. No. 846,098 such procedure results in a reaction mixture containing dissolved terephthaloyl chloride, unreacted excess pyridine, unreacted excess phosgene and undissolved pyridine hydrochloride.

Note (1): Prior to the carboxylic acid chloride synthesis, phosgene was bubbled into cold dichloromethane for a given period of time at a constant rotameter setting. When charging was deemed complete, an aliquot was removed and quenched in cold methanolic potassium hydroxide. The liberated chloride ion was determined by titration, and the quantity of phosgene charged, corrected for sampling, was calculated. The portions of other reagents were then prorated.

During the condensation stage which followed bisphenol A and phosgene were added in separate streams concurrently to the terephthaloyl chloride solution. A 6.92 g (69.9 mmol) portion of the phosgene was introduced at a rate of 0.24 g/min. over 29 minutes; and a solution containing 45.60 g (199.8 mmol) bisphenol A, 1.05 g (7.0 mmol) t-butylphenol, 45.53 g (579.4 mmol) pyridine and 110 mL dichloromethane was added starting, for convenience, 80 seconds after the start of phosgene introduction. The phosgene addition was halted after 29 minutes; the bisphenol A addition continued, and was completed in 33 minutes. The temperature was maintained at 25° C. with a stirring rate of 500 rpm throughout this and subsequent reaction steps. After a holding period of 35 minutes the phosgene flow was resumed, and a 2.40 g (24.3 mmol) portion was added at a rate of 0.06 g/min. over 42 minutes. (See Note (2) below). The reaction mixture was stirred an additional 15 minutes; then 50 mL methanol was cautiously added to convert all remaining phosgene and any carbonylchloride end groups to the unreactive methyl ester form.

Note (2): The bulk portion of phosgene charged during the condensation was estimated from the rotameter setting calibrated by titration in the initial stage of the experiment. After the holding period the phosgene flow was resumed and continued until the viscosity of the reaction mixture increased markedly. This final charge and flow rate were calculated based on a chloride ion titration of the filtrate obtained during the first precipitation and washes of the polymer product.

To the reaction mixture quenched with methanol, a 250 mL portion of water was added, and the resulting heterogeneous mixture was emulsified in a flask equipped with a stopcock drain and a mechanical stirrer operating at approximately 700 rpm. Precipitation was carried out in a stainless steel blender by addition of the emulsion over 15–20 minutes to 2000 mL isopropanol which was initially heated to 60–65° C. and rapidly stirred. The agitation was continued for about 20 minutes while the temperature decreased to 40°–45° C. The solids were filtered and washed sequentially with 1000 mL portions each of isopropanol, water initially heated to 90°–100° C., and isopropanol. The polymer was then dissolved in 50 mL dichloromethane, precipitated and washed as above. This purification procedure was repeated a third time except that the dichloromethane solution was filtered under vacuum through a medium sintered glass frit prior to emulsifying. The purified material was dried in vacuo at 130°–140° C. overnight to give 58.2 g (93.4% of theory) poly(ester-carbonate).

Infrared and NMR analyses of composition indicated terephthalate to bisphenol A ratios of 0.53 and 0.51 respectively. (See Note (3) below). The reduced viscosity was 0.79 dL/g. Differential scanning calorimetry and thermal gravimetric analysis (DSC and TGA) measurements revealed that there was a well defined glass transition at 183° C. and no significant weight loss below 380° C. A 0.115 inch thick (2.92 mm) plaque, produced by compression molding at 315° C., exhibited a transmission haze value (ASTM D1003) of 3.1% and a yellowness index (ASTM D1925) of 6.9%.

Note (3):

(A) Determination of composition by the infrared method involves measurement of the absorbance ratio for bands attributed to the carbonyl groups in the carboxylic ester (1740 cm$^{-1}$) and in the carbonate (1775 cm$^{-1}$) linkages. The analyses were performed on thin films cast from dichloromethane solution, and a calibration curve (as shown in the above cited U.S. application Ser. No. 764,623, FIG. 2) was determined with known mixtures of pure poly(bisphenol A carbonate) and poly(bispenol A terephthalate). The carbonate to ester ratio and a derived expression for the terephthalate to bisphenol A ratio are defined by the equations shown below, where "x" is the mol percent of ester units in the polymer (formed by condensations of 1 BPA+1 TPC) and "y" is the mol percent of carbonate units; noting that in each TPC unit there are two carbonyl groups and one carbonyl group in each carbonate unit:

$$(\text{carbonate/ester})_{IR} = y/2x$$

$$(\text{terephthalate/bisphenol A})_{IR} = x/(x+y) = 1/[1+2(\text{carbonate/ester})_{IR}].$$

(B) The $^1$H magnetic resonance method measures composition by comparison of the integrated areas due to terephthalate ring protons ($\delta 8.30$) and bisphenol A ring protons ($\delta 7.20$). The analyses were performed on 5.0% (w/w) polymer solutions in chloroform-d assuming equal response factors for the two types of protons measured; that is, the method was not calibrated. The derived terephthalate to bisphenol A ratio is defined by the expression shown below.

$$(\text{terephthalate/bisphenol A})_{NMR} = x/(x+y).$$

Mechanical Properties of Poly(ester-carbonate) Prepared Per the Above Example 1

Approximately equal amounts of the products from two runs carried out essentially as above were dissolved in dichloromethane, precipitated in hot isopropanol, washed with one portion of isopropanol and dried in vacuo as for the product of Example 1. This composite sample was compression molded at 315° C. and submitted for mechanical testing. The properties found are shown in the Table below.

| TABLE OF PROPERTIES | |
|---|---|
| Viscosity number | |
|   before molding | 0.76 dL/g |
|   after molding | 0.75 dL/g |
| Glass transition, $T_g$ | 183° C. (DSC) |
| Heat deflection temperature | 170° C. (ASTM D648, fiber stress = 264 psi (182 N/cm$^2$)) |
| Izod impact strength (Astm D256, Method A) | 6.8 ft-lb/in (3.63 N · m/cm) |
| Tensile modulus | 390,000 lb/in$^2$ (269,000 N/cm$^2$) |
| Yield elongation | 13.5% |
| Yield strength | 9,340 lb/in$^2$ (6,440 N/cm$^2$) |
| Ultimate elongation | 50% |
| Ultimate tensile strength | 9,100 lb/in$^2$ (6,274 N/cm$^2$) |

Example 2

A. Scale-Up of Polycondensation Procedure

A 500-L reactor is charged with 190 L dichloromethane and 13.23 kg (167.2 mol) pyridine. The reactor temperature is maintained at 25° C. with a stirring rate of 200 rpm while 16.24 kg (167.2 mol) phosgene is introduced over 40 minutes (0.413 kg/min). The stirring rate is increased to 500 rpm, and a slurry of 12.63 kg (76.0 mol) terephthalic acid in 40 L dichloromethane is added over 40 minutes. Stirring at 25° C. is maintained for 30 minutes to complete the terephthaloyl chloride preparation.

During the condensation stage which follows, bisphenol A and phosgene are added in separate streams concurrently to the terephthaloyl chloride solution. A 5.26 kg (53.2 mol) portion of phosgene is introduced over 30 minutes (0.175 kg/min); and a solution containing 34.70 kg (152.0 mol) bisphenol A, 0.80 kg (5.3 mol) t-butylphenol, 34.87 kg (440.8 mol) pyridine and 80 L dichloromethane is added over the same period. The reaction mixture is stirred for an additional 30 minutes, and 1.40 kg (14.2 mol) phosgene is then introduced over 40 minutes (0.035 kg/min).

The reaction mixture is stirred an additional 15 minutes; then methanol is cautiously introduced to convert all remaining phosgene and any carbonylchloride end groups to the unreactive methyl ester form. The polymer is isolated and purified in the fashion described below.

B. Polymer Solution Filtration

The filter media used to filter the polymer solution should have an absolute retention rating of no less than 80 $\mu$m (46 $\mu$m mean retention). The use of a finer filter may result in fractionation of the polymer if the oligomer distribution is high in the more insoluble ester oligomers.

C. Liquid-Liquid Extraction of Polymer Solution

Pyridine hydrochloride and unreacted pyridine present can be removed from the polymer solution by liquid-liquid extraction using dilute (1.5%) aqueous HCl. The distribution coefficient of pyridine between a 10% polymer solution and water is estimated to be 300–400 at a HCl/pyridine mol ratio of 2/1. The procedure can be done, and has been performed, in a batch process or in continuous countercurrent column extraction.

In the case of continuous extraction, the polymer solution viscosity should be kept below 100–200 cp (as measured on a Brookfield LVF viscometer) by dilution with DCM if necessary. A more viscous solution is difficult to process in the countercurrent column. The final pyridine concentration should be lower than 4 ppm as measured by gas chromatography.

The pyridine-free polymer solution is extracted with water to remove HCl. This step is extremely critical; results have shown higher concentrations of chloride ion in dried polymer samples which were HCl extracted than in those which were hot water extracted. Continuous packed column extraction of the HCl is fairly direct. The viscosity of the polymer solution must be monitored, since the aqueous phase will remove up to 2% (w/v) of DCM with each pass, increasing the polymer solution concentration. This can be avoided by using water saturated with DCM, or by making up the lost DCM in the organic phase. Batch extraction presents a problem only if not enough water is used to remove the HCl. In this case, the emulsion formed may not separate readily. The water volume should be at least 3–4 times the polymer solution volume to avoid this problem.

D. Polymer Isolation

The polymer solution or preferably the polymer solution emulsified with 1:1 by volume of water, contains dissolved polymer, and if not liquid-liquid extracted per (C) above, contains also excess pyridine and pyridine hydrochloride (dissolved and undissolved). The polymer is precipitated at room temperature in a medium of acetone or an acetone-water mixture using a 3:1 volume ratio of polymer solution:medium. By use of acetone-water mixture, a higher yield is obtained since low oligomers will not remain dissolved in the acetone-water mixture.

Critical process variables are rate of stirring of the acetone and addition rate of the polymer solution. Stirring and dispersion efficiency or turbulence must be high to obtain small ($<\frac{1}{8}''=3.175$ mm average diameter) and discrete polymer particles. The polymer solution addition rate must be low, especially initially, to avoid agglomeration and lump formation. The use of a dispersion nozzle to separate the polymer stream and avoid high local concentrations of polymer is helpful. A 100 gallon 378.52 polymerization mixture can be precipitated in 60 to 100 minutes, depending on stirring efficiency. Precipitation should be interrupted if discrete particle formation is not observed. Large, agglomerated masses will break up under continued stirring. Precipitation may then continue.

A processing advantage is obtained if the acetone nonsolvent is heated to above 40° C. In this case, DCM is flashed off and condensed during precipitation, increasing the rate of particle precipitation.

Alternative nonsolvents can be used instead of acetone. Isopropanol gives higher yeilds, but may not be as good a solvent as acetone for organic impurities present in the polymerization mixture. The precipitation procedure remains the same in the case of isopropanol precipitation, except that more care must be taken to ensure discrete particle formation. Polymer yields found upon using various solvent systems range from 89% up to 100%.

E. Polymer Purification

Pyridine and pyridine hydrochloride, the major impurities, are removed from the polymer by one of two methods: (1) liquid-liquid extraction from the polymer solution as already described at (C) above, or (2) solvent extraction from precipitated solid polymer particles by multiple washing with hot (70° C.–90° C.) water.

In the second method, the wash water volume is 2–4 times the polymer solution volume. The wash liquid is drained from the polymer by means of a basket centrifuge or a basket vacuum filter. After three water washes, the polymer is redissolved in DCM (110 gallons of DCM/100 lb. polymer, i.e., 9.18 L/kg), filtered, reprecipitated, and rewashed in hot water. A final wash and rinse is performed with an acetone-water mixture.

F. Drying

The polymer should be dried prior to further processing. Upon drying at 110° C. in vacuo, residual moisture levels as determined by Karl Fischer analysis are 0.043% after 16 hours, and 0.012% after 24 hours. Similar levels can also be achieved by drying in a forced air oven.

The dried polymer can be used as such for molding purposes, and can be stabilized against color change on heating, if desired, by use of heat stabilizers known for polyesters of TPA and for BPA polycarbonate.

Preparation of Poly(ester-carbonate) from Other Acids, Bisphenol A and Phosgene Condensations employing isophthalic acid (Example 3) and a commercially available mixture of trans- and cis- cyclohexane-1,4-dicarboxylic acid (Example 4) indicated general applicability of the method of this invention to production of the poly(ester-carbonate) of dihydric phenols and aromatic or cycloaliphatic dicarboxylic acids. The procedure was essentially identical to that employed in Example 1 above. No attempt was made to optimize reaction conditions. Some adjustment of the rates of reagent addition and the duration of holding periods would be necessary when using acid chlorides, other than terephthaloyl chloride, to produce serviceable thermoplastics of suitably high molecular weight.

Example 3

Following essentially the procedure described in Example 1, 56.08 g (90.3% of theory) of purified poly(ester-carbonate) was obtained from 16.54 g (99.6 mmol) of isophthalic acid, 45.45 g (199.1 mmol) of bisphenol A, and 32.18g (325.3 mmol) of phosgene.

Infrared and NMR analyses of composition indicated an isophthalate to bisphenol A ratio of 0.51. The viscosity number was 0.53 dL/g. DSC and TGA measurements revealed that there was a well defined glass transition at 168° C. and no significant weight loss below 375° C. A 0.126 inch (3.20 mm) thick plaque produced by compression molding at 225° C. exhibited a transmission haze value of 6.7% and a yellowness index of 7.5%.

Example 4

Following essentially the procedure described in Example 1, 58.57 g (91.2% of theory) of purified poly(ester-carbonate) was obtained from 17.55 g (101.9 mmol) of cyclohexane-1,4-dicarboxylic acid, 46.54 g (203.9 mmol) of bisphenol A and 32.03 g (323.8 mmol) of phosgene.

Infrared and NMR analyses of composition respectively indicated cyclohexane-1,4-dicarboxylate to bisphenol A ratios of 0.43 and 0.50. The viscosity number was 0.60 dL/g. DSC and TGA measurements revealed that there was a well defined glass transition at 156° C. and significant weight loss beginning at approximately 330° C. in an argon atmosphere. A 0.141 inch (3.58 mm) thick plaque produced by compression molding at 250° C. exhibited a transmission haze value of 14.5% and a yellowness index of 7.9%.

We claim:

1. In a process for production of poly(ester-carbonate) of dihydric phenol and of aromatic or cycloaliphatic dicarboxylic acid from a reaction mixture containing dichloride of at least one such acid, dissolved in a chlorinated hydrocarbon solvent inert under the reaction conditions having from 1 to 6 carbon atoms and from 1 to 4 chlorine atoms, said process employing a tertiary nitrogen base, having $pK_b$ in aqueous solution at 25° C. in the range 7–11, to catalyze condensation of such dihydric phenol with said dichloride and with phosgene employed as carbonate precursor, and to serve as HCl acceptor for the HCl generated in said condensation reactions; the improvement which comprises:

(1) Feeding at least one such dihydric phenol into said dichloride solution at temperature in the range 0°–100° C., said dichloride solution containing at the start of said condensation reaction, phosgene in the range between 10% and 50% of the stoichiometric proportion of phosgene: total dihydric phenol required for formation of the poly(ester-carbonate) final product with the desired mol ratio in the range 1.00:0.05 up to 1.00:0.70 of dihydric phenol:dichloride residues;

(2) Concurrently with the feeding of dihydric phenol, agitating the reaction mixture and feeding phosgene in a separate stream thereto, until all dihydric phenol for the reaction has been added and at least 80% but not over 97% of the stoichiometrically required phosgene for reaction with all hydroxyl groups has been added;

(3) Maintaining during the feeding of dihydric phenol, at least a 10% molar excess of tertiary nitrogen base over that required by stoichiometry;

(4) Then allowing time for the condensation reaction forming poly(ester-carbonate) to come essentially to completion while the phosgene added is being brought at least to the stoichiometrically required quantity for reaction with all hydroxyl groups.

2. In the process of claim 1: employing, as the principal dihydric phenol, bisphenol A, and as the principal dicarboxylic acid, terephthalic acid; and employing as tertiary nitrogen base, one having $pK_b$ in aqueous solution at 25° C. in the range between 7 and 9.

3. In the process of claim 2: employing dichloromethane as the inert solvent and pyridine as the tertiary nitrogen base; providing in the terephthaloyl chloride solution at the start of the condensation reaction between phenolic hydroxyl groups and phosgene, a quantity of phosgene in the range between 20% and 40% of the stoichiometric proportion of phosgene:total bisphenol A required for formation of the poly(ester-carbonate) final product having mol ratio of bisphenol A:terephthalate:carbonate residues of 1.0:0.5:0.5; feeding bisphenol A to the terephthaloyl chloride solution in total molar proportion of about 1:0.5 of bisphenol A:terephthaloyl chloride and feeding phosgene thereto in at least the stoichiometric quantity to produce said final product; maintaining temperatures between 15° and 50° C. and maintaining an excess of base in the reaction mixture of at least 30% over that required to react with hydrogen chloride being formed.

4. In the process of claim 1: employing as the principal dihydric phenol, bisphenol A and as the principal dicarboxylic acid, isophthalic acid.

5. In the process of claim 1: employing as the principal dihydric phenol, bisphenol A and as the principal dicarboxylic acid, cyclohexane-1,4-dicarboxylic acid.

* * * * *